US008305652B2

(12) United States Patent  
Honda et al.

(10) Patent No.: US 8,305,652 B2  
(45) Date of Patent: Nov. 6, 2012

(54) IMAGE READING APPARATUS, IMAGE FORMING APPARATUS, AND CARRIAGE POSITIONING METHOD

(75) Inventors: Takashi Honda, Toyokawa (JP); Tetsuhiro Shibata, Hamamatsu (JP); Shinichi Yabuki, Toyokawa (JP); Yoshiki Nakazawa, Toyokawa (JP)

(73) Assignee: Konica Minolta Business Technologies, Ltd., Chiyoda-Ku, Tokyo (JP)

( * ) Notice: Subject to any disclaimer, the term of this patent is extended or adjusted under 35 U.S.C. 154(b) by 543 days.

(21) Appl. No.: 12/552,434

(22) Filed: Sep. 2, 2009

(65) Prior Publication Data

US 2010/0073737 A1    Mar. 25, 2010

(30) Foreign Application Priority Data

Sep. 19, 2008   (JP) ................... 2008-240766

(51) Int. Cl.  
*H04N 1/04* (2006.01)

(52) U.S. Cl. ......... 358/474; 358/448; 358/461; 358/497

(58) Field of Classification Search ................. 358/474, 358/448, 461, 497, 498  
See application file for complete search history.

(56) References Cited

U.S. PATENT DOCUMENTS

| 6,975,435 | B1 * | 12/2005 | Maitani et al. ................. 358/475 |
| 7,133,165 | B2 | 11/2006 | Yamada et al. |
| 8,023,163 | B2 | 9/2011 | Morinaga et al. |
| 2005/0219646 | A1 * | 10/2005 | Susaki ........................ 358/474 |
| 2008/0024540 | A1 * | 1/2008 | Grosse et al. ................. 347/19 |

FOREIGN PATENT DOCUMENTS

| CN | 101212537 A | 7/2008 |
| JP | 5-188486 A | 7/1993 |
| JP | 2000-113162 A | 4/2000 |
| JP | 2003-051918 A | 2/2003 |
| JP | 2003-087517 A | 3/2003 |
| JP | 2004-104467 A | 4/2004 |
| JP | 2005-295084 | 10/2005 |

OTHER PUBLICATIONS

Notification of Reasons for Refusal dated Aug. 24, 2010, issued in the corresponding Japanese Patent Application No. 2008-240766, and an English Translation thereof.  
Chinese Notification of Granting Patent Right dated Jul. 4, 2012 issued in the corresponding Chinese Patent Application No. 200910173875.0 and English translation.

* cited by examiner

*Primary Examiner* — Houshang Safaipour  
(74) *Attorney, Agent, or Firm* — Buchanan Ingersoll & Rooney PC

(57) ABSTRACT

An image reading apparatus includes a carriage having mounted thereon a linear light source and an image sensor and a reference pattern member disposed at a reference position located toward the first direction from a home position. The current location of the carriage is judged relatively to first and second areas that are divided by a boundary defined in advance at a location toward the first direction from the reference position. The first area is located toward the first direction and the second area is located toward the second direction. Immediately after the power is turned ON, current location information indicating whether the carriage is currently located in the first area or the second area is read from the nonvolatile memory. The carriage is first moved to the reference position and then moved a predetermined distance in the second direction, so that the carriage is duly positioned at the home position.

13 Claims, 10 Drawing Sheets

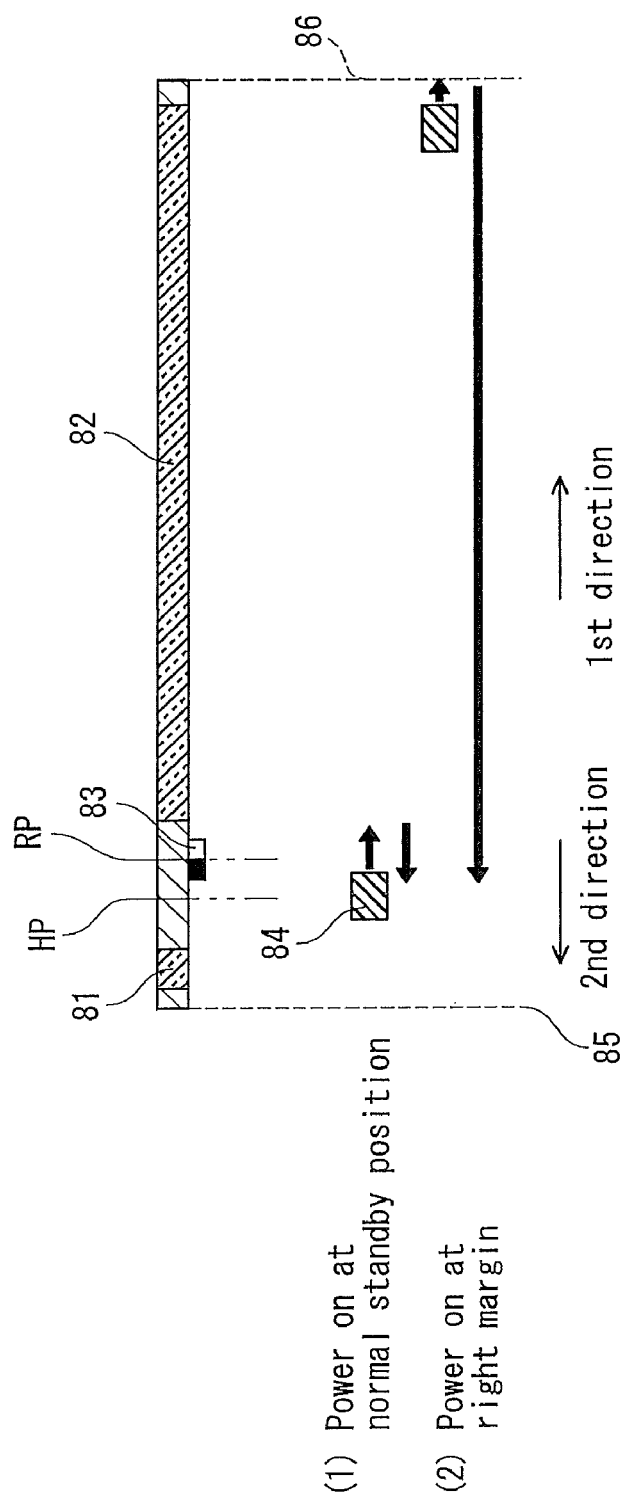

IMAGE READING APPARATUS, IMAGE FORMING APPARATUS, AND CARRIAGE POSITIONING METHOD

This application is based on an application No. 2008-240766 filed in Japan, the contents of which are hereby incorporated by reference.

BACKGROUND OF THE INVENTION (1) Field of the Invention

The present invention relates to an image reading apparatus with a carriage having mounted thereon a linear light source that emits light to a document sheet to be read. The present invention also relates to an image forming apparatus having the image reading apparatus and a method for positioning the carriage at a home position.

(2) Description of the Related Art

According to one practical configuration of an image reading apparatus for reading the image of a document sheet placed on a platen glass, a linear light source that throws light onto the document sheet is mounted on a carriage. In another configuration, an image sensor that receives light reflected from the document sheet is also mounted on the carriage, along with the linear light source.

Typically, a linear light source is constructed from a linear lamp, such as a xenon lamp or a fluorescent lamp, and mounted on the carriage to be in parallel with the main scanning direction of the image sensor. The carriage includes an image reading motor constructed, for example, from a pulse motor and also includes a power transmission unit constructed from pulleys, belts, and the like. With those components, the carriage is configured to make reciprocating motion below the platen glass in the sub-scanning direction, which is a direction orthogonal to the main scanning direction.

Typically, the carriage is positioned at the home position (the normal standby position) located in the vicinity of the platen glass. To read the image of a document sheet placed on the platen glass, the image reading motor translates the carriage (i.e., moves the carriage uniformly without rotation) from the home position in a first direction parallel to the platen glass. While the carriage is in the translatory motion, the linear light source emits light onto the document sheet and the image sensor receives light reflected from the document sheet. The carriage is first moved in the first direction a predetermined distance corresponding to the size of the document sheet that is placed on the platen glass and then moved back to the home position in a second direction that is the reverse direction of the first direction.

Note that the amount of light emitted by the linear light source mounted on the carriage may not be uniform in the longitudinal direction (sub-scanning direction), which leads to errors such as uneven exposure and uneven image forming on the lens. In order to correct such errors, shading correction is performed. In the shading correction, correction factors necessary for conducting the shading correction are calculated prior to the reading of the image of a document sheet. When the image sensor subsequently acquires the image data of the document sheet, the thus acquired image data is corrected using the calculated correction factor. Generally, an image reading apparatus has a reference pattern member that forms a reference pattern. The reference pattern member is disposed at a location where the reference pattern is readable by the image sensor. The reference pattern is formed with a black reference area and a white reference area that are used for obtaining reference data of the respective colors necessary for conducting the shading correction.

To conduct the shading correction, the carriage is moved from the home position to the position where the reference pattern is readable by the image sensor. At the position, the image sensor receives light reflected from the black and white reference areas of the reference pattern. Then, the carriage is restored to the home position. The correction factors necessary for the shading correction are calculated based on the amounts of reflected light received by the image sensor from the black and white reference areas.

The carriage is normally positioned at the home position. At the time of reading of the image of a document sheet, the carriage is moved a distance necessary to enable the image sensor to read. At the time of the shading correction, the carriage is moved to a position where the reference pattern is detectable by the image sensor. Conventionally, whether or not the carriage is currently located at the home position is detected by a home position sensor as disclosed in JP patent application publication No. 05-188486 (hereinafter, "Patent Document 1").

Unfortunately, however, the use of a home position sensor as disclosed in Patent Document 1 is not preferable in terms of economy and cost. In addition, the space for accommodating the home position sensor needs to be secured in the vicinity of the moving range of the scanner (carriage), which may lead to another disadvantage that the compactness of the image reading apparatus needs to be compromised. This is more problematic regarding all-in-one MFPs into which an image reading apparatus and an image forming apparatus are integrated. Generally, MFPs are required to realize improved space-saving efficiency in order to reduce the size. It is therefore difficult to secure space for a home position sensor.

JP patent application publication No. 2004-104467 (hereinafter "Patent Document 2") discloses a configuration according to which no home position sensor is provided but an optically readable detection pattern is provided at the location of the home position. The travel object (carriage) is positioned at the home position according to an electric signal generated as a result of detecting the detection pattern.

Unfortunately, however, the configuration disclosed by Patent Document 2 requires to specifically provide, at the location of the home position, a detection pattern for detecting the home position, which may increase cost. In addition, the space for providing the detection pattern needs to be secured. This is more problematic regarding image reading apparatuses having an automatic document feeder (ADF). Normally, the home position of such an apparatus is located between the position for reading an image of a document sheet transferred by the ADF and the position for reading an image of a document sheet placed on the platen glass. It is therefore difficult to secure the space for providing the detection pattern.

FIG. 11 is a schematic view for illustrating the home position of an image reading apparatus having an automatic document feeder (ADF). The image reading apparatus has a slit formed through the top wall of the housing and at a position corresponding to the position for reading an image of a document sheet transferred by the ADF. A contact glass (slit glass) 81 is fit within the slit and flanked by a contact glass for placing a document sheet thereon. A carriage 84 has a linear light source and an image sensor both mounted thereon. The home position HP of the carriage 84 is set at a location between the slit glass 81 and a platen glass 82. In addition, a reference pattern member 83 having a reference pattern used for shading correction is disposed at a location between the home position HP and the platen glass 82.

As described above, the home position HP is established between the slit glass 81 and the platen glass 82, and the reference pattern member 83 is provided between the home position HP and the platen glass 82. With the above configuration, it is difficult to secure space between the slit glass 81 and the platen glass 82, for additionally providing a sensor and a dedicated detection pattern both for detecting whether or not the carriage is located at the home position.

In order to address the problems noted above, a suggestion has been made regarding the image reading apparatus having the configuration shown in FIG. 11. When the power is turned ON (i.e., at the start of power supply to the image reading apparatus), the image sensor mounted on the carriage 84 detects the boundary between the black reference area and the white reference area of the reference pattern formed on the reference pattern member 83 and designates the detected boundary as a reference position RP. The carriage 84 is then moved with reference to the reference position RP to be positioned at the home position HP.

That is, as schematically denoted by (1) in FIG. 11, in order to enable the image sensor to detect the reference pattern of the reference pattern member 83, the carriage 84 is moved at the power-ON a first predetermined distance in the first direction, which is a sub-scanning direction of the image of a document sheet placed on the platen glass 82. Once the image sensor detects the reference pattern, the carriage 84 is then moved to the reference position RP based on the detected position at which the reference pattern is detected. Subsequently, the carriage 84 is moved a second predetermined distance (the distance from the reference position RP to the home position HP) in the second direction, which is the reverse direction of the first direction. As a result, the carriage 84 is restored to the home position HP.

With the above configuration, if the image sensor fails to detect the reference pattern of the reference pattern member 83 even after the carriage 84 has been moved the first predetermined distance in the first direction, the current location of the carriage 84 cannot be identified. Therefore, the carriage 84 is moved a maximum permissible travel distance in the second direction in order to forcibly bring the carriage 84 to a marginal position 85 of the image reading apparatus in the sub-scanning direction. Subsequently, the carriage 84 is moved in the first direction to enable the image sensor to detect the reference pattern member 83. Once the image sensor detects the reference pattern member 83, the carriage 84 is moved the second predetermined distance into the second direction from the detection position. As a result the carriage 84 is restored to the home position HP.

The above-described configuration, however, involves the following risk. That is, even after the carriage 84 collides against the housing at the marginal position 85 and thus comes to a stop, the motor may keep rotating without being stopped and the driving force into the second direction may be given to the carriage 84. In such a case, a power transmission unit configured to move the carriage 84 is likely to cause trouble. For example, the coupling between the pulley and belt may break away. After such trouble, the power transmission unit is no longer capable of moving the carriage 84. In addition, the collision noise may occur to undesirably make the user feel anxiety or discomfort.

The same trouble may occur when the carriage 84 is located in the vicinity of a side wall 86 of the housing, as denoted by (2) in FIG. 11. The side wall 86 is located away from the slit glass 81 across the platen glass 82. That is, in an attempt to move the carriage 84 in the first direction to enable the image sensor to detect the reference pattern of the reference pattern member 83, the carriage 84 comes to collide against the side wall 86 of the housing before traveling the predetermined distance.

SUMMARY OF THE INVENTION

The present invention is made to solve the problems noted above and aims to provide an image reading apparatus configured without a dedicated sensor for detecting the home position and is till capable of positioning the carriage at the home position without the risk of a collision of the carriage against the housing. The present invention also aims to provide an image forming apparatus having the image reading apparatus and a method for positioning the carriage at the home position.

In order to achieve the above aim, the present invention provides an image reading apparatus including: a carriage having a linear light source operable to emit light onto a surface of a document sheet placed on a platen glass; an image sensor operable to receive part of the emission light reflected from the surface of the document sheet; a carriage drive mechanism operable to move the carriage in a first direction and a second direction, the first direction being orthogonal to a longitudinal direction of the linear light source, and the second direction being reverse to the first direction; a reference pattern member having a reference pattern and disposed at a position within a travel path of the carriage, such that the reference pattern is detectable by the image sensor; a non-volatile storage unit; a data-write controller operable to (i) judge whether the carriage is currently located in a first area or a second area that are divided by a boundary defined in advance for acquiring information indicating the current location of the carriage and (ii) write an update of the current location information into the nonvolatile storage unit each time the carriage is moved across the boundary between the first and second areas, the boundary coinciding with the position of the reference pattern member or with a position shifted toward the first direction from the reference pattern member, the first area being located toward the first direction, and the second area being located toward the second direction; and a carriage controller operable to (i) control, immediately upon power supply to the image reading apparatus, the carriage drive mechanism to move the carriage toward the reference pattern member based on the current location information held in the storage unit, and (ii) control, when the image sensor detects the reference pattern, the carriage drive mechanism to move the carriage in the second direction to a home position that is located a predetermined distance away from the reference pattern member.

The present invention also provides an image forming apparatus having: an image reading apparatus as defined above; and a printer unit operable to produce an image on a recording sheet according to image data read by the image reading apparatus.

The present invention also provides a method for positioning a carriage of an image reading apparatus at a home position. The image reading apparatus includes: the carriage having a linear light source operable to emit light onto a surface of a document sheet placed on a platen glass; an image sensor operable to receive part of the emission light reflected from the surface of the document sheet; a carriage drive mechanism operable to move the carriage in a first direction and a second direction, the first direction being orthogonal to a longitudinal direction of the linear light source, and the second direction being reverse to the first direction; a reference pattern member having a reference pattern and disposed at a position within a travel path of the carriage, such that the reference pattern is detectable by the image sensor; a non-volatile storage unit; a data-write controller; and a carriage controller. The method includes a write step and a moving step. In the write step, the data-write controller (i) judges whether the carriage is currently located in a first area or a second area that are divided by a boundary defined in advance for acquiring information indicating the current location of the carriage and (ii) writes an update of the current location information into the nonvolatile storage unit each time the carriage is moved across the boundary between the first and second areas, the boundary coinciding with the position of the reference pattern member or with a position shifted toward the first direction from the reference pattern member, the first area being located toward the first direction, and the second area being located toward the second direction. In the moving step, the carriage controller (i) controls, immediately upon power supply to the image reading apparatus, the carriage drive mechanism to move the carriage toward the reference pattern member based on the current location information held in the storage unit, and (ii) controls, when the image sensor detects the reference pattern, the carriage drive mechanism to move the carriage in the second direction to a home position that is located a predetermined distance away from the reference pattern member.

According to one aspect of the present invention, immediately upon power is supplied to the image reading apparatus, the carriage is moved to the location where the reference pattern member is disposed, with reference to the current location information held in the storage unit. That is, regardless of whether the carriage is currently located in first area or the second area, it is ensured that the carriage is moved toward the reference pattern, so that collision of the carriage against a side wall of the housing is reliably avoided. Once the carriage is moved to the reference pattern, the carriage is then reliably positioned at the home position. As a consequence, there is no need to employ a sensor or the like for detecting that the carriage is poisoned at the home position. As a result, the number of components is reduced and thus the manufacturing cost is reduced. In addition, there is no need to secure space for accommodating such a sensor or the like.

Preferably, the image sensor is mounted on the carriage.

Preferably, the carriage controller is operable to control the carriage drive mechanism to move the carriage in the first direction, if the current location information held in the storage unit indicates that the carriage is currently located in the second area.

Preferably, a maximum travel distance is a distance that the carriage located in the second area travels at maximum to reach a position where the reference pattern is detectable by the image sensor. If the carriage located in the second area is moved the maximum travel distance in the first direction and still fails to detect the reference pattern, the carriage controller is operable to control the carriage drive mechanism to reverse the carriage in the second direction.

Preferably, the carriage controller is operable to control the carriage drive mechanism to move the carriage in the second direction, if the current location information held in the storage unit indicates that the carriage is currently located in the first area.

Preferably, a maximum travel distance is a distance that the carriage located in the second area travels at maximum to reach a position where the reference pattern is detectable by the image sensor. If the carriage located in the second area is moved the maximum travel distance in the first direction and still fails to detect the reference pattern, the carriage controller is operable to (i) control the carriage drive mechanism to stop the movement of the carriage and (ii) issue a warning.

Preferably, the reference pattern includes a black reference area and a white reference area that are adjacent to each other, the black and white reference areas being used respectively for adjusting a black color level and a white color level of the image sensor.

Preferably, a slit glass is located at a position shifted toward the second direction from the home position, such that a document sheet fed by an automatic document feeder passes over the slit glass. In a mode of reading an image of the document sheet passing over the slit glass, the carriage controller is operable to control the carriage drive mechanism to move the carriage to a position immediately below the slit glass, so that the image sensor is enabled to read the image of the document sheet passing over the slit glass.

Preferably, the boundary is defined to coincide with the position shifted toward the first direction from the reference pattern member.

Preferably, the boundary is defined to coincide with or in a vicinity of a midpoint of the platen glass lengthwise along a travel direction of the carriage.

Preferably, the carriage controller is operable to (i) control, immediately before the image sensor reads an image of the document sheet placed on the platen glass, the carriage drive mechanism to move the carriage to the position of the reference pattern member based on the current location information held in the storage unit, and (ii) control, when the image sensor detects the reference pattern, the carriage drive mechanism to move the carriage the predetermined distance in the second direction to the home position.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 11 is a schematic view illustrating an example of a control procedure performed by a conventional image reading apparatus for positioning a carriage at a home position.

DESCRIPTION OF THE PREFERRED EMBODIMENT

Figure 1:
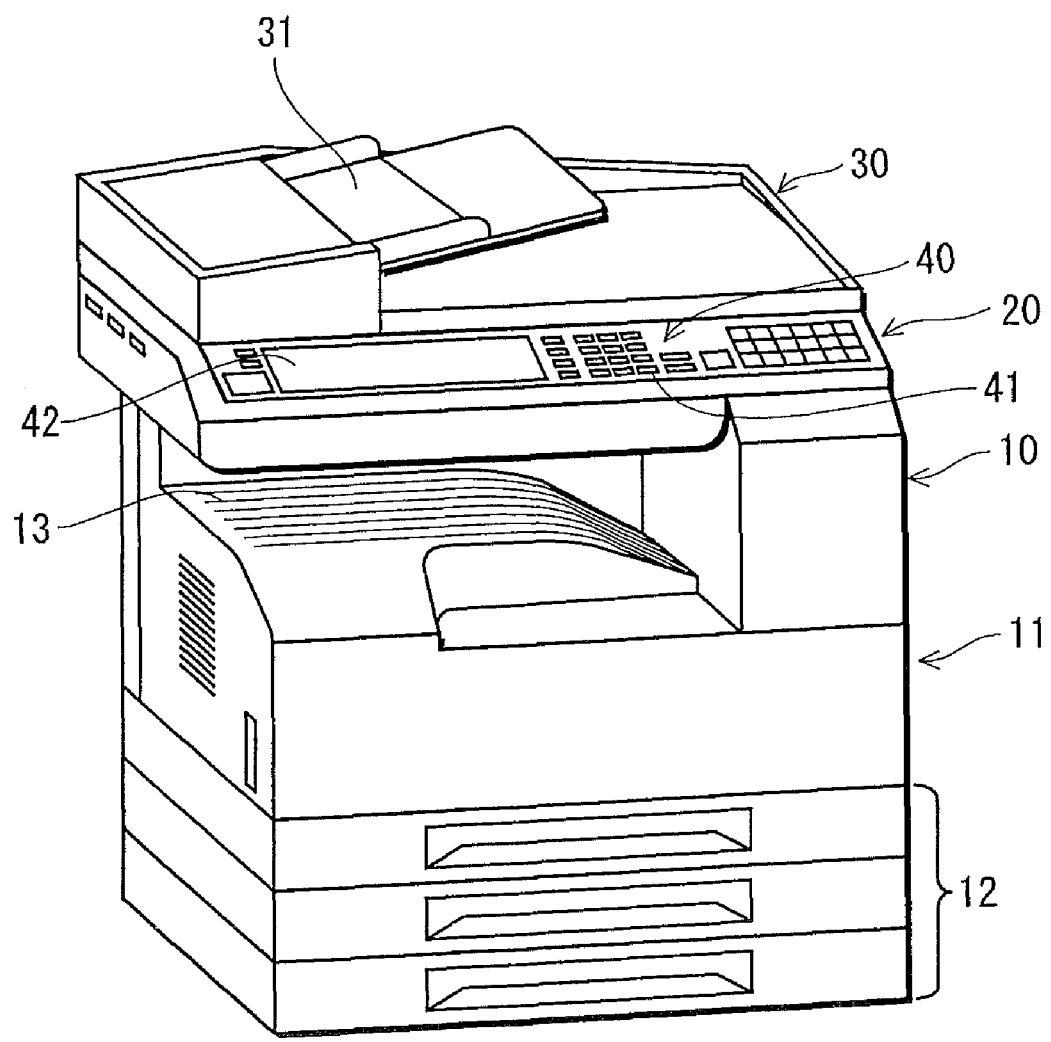
FIG. 1 is an oblique view showing an image forming apparatus having an image reading apparatus consistent with one embodiment of the present invention.

FIG. 1 is an oblique view showing an exemplary image forming apparatus having an image reading apparatus consistent with one embodiment of the present invention. The image forming apparatus is an all-in-one (AIO) multiple function peripheral (MFP) into which the functions of copier, scanner, printer, facsimile and so on are integrated. In, the image forming apparatus is capable of data transmission via a network. As shown in FIG. 1, the image forming apparatus includes an image forming unit 10, a scanner unit 20 disposed on the image forming unit 10, and an ADF (automatic document feeder) 30 disposed on the scanner unit 20. The image forming unit 10 is for forming a toner image on a recording sheet such as a sheet of paper. The scanner unit 20 is the image reading apparatus.

The ADF 30 automatically feeds a document sheet to be read to the scanner unit 20. The scanner unit 20 optically reads an image of the document sheet fed by the ADF 30 or placed on the scanner unit 20 to generate image data. The image forming unit 10 includes a printer unit 11 and a paper feed unit 12 disposed below the printer unit 11. The paper feed unit 12 feeds a recording sheet to the printer unit 11. The printer unit 11 prints on the recording sheet the toner image using a known electrophotographic method, according to image data generated by the scanner unit 20 or received via the network. The recording sheet on which the toner image is printed by the printer unit 11 is discharged onto a paper-discharge tray 13 disposed between the scanner unit 20 and the image forming unit 10.

The scanner unit 20 is provided with an operation panel 40 at front. The operation panel 40 includes a key input unit 41 having a plurality of keys for allowing key input of letters and numerals and a display unit 42 for displaying an instruction menu, information regarding the read image, and the like. The display unit 42 may be constructed of a liquid crystal panel, for example.

Figure 2:
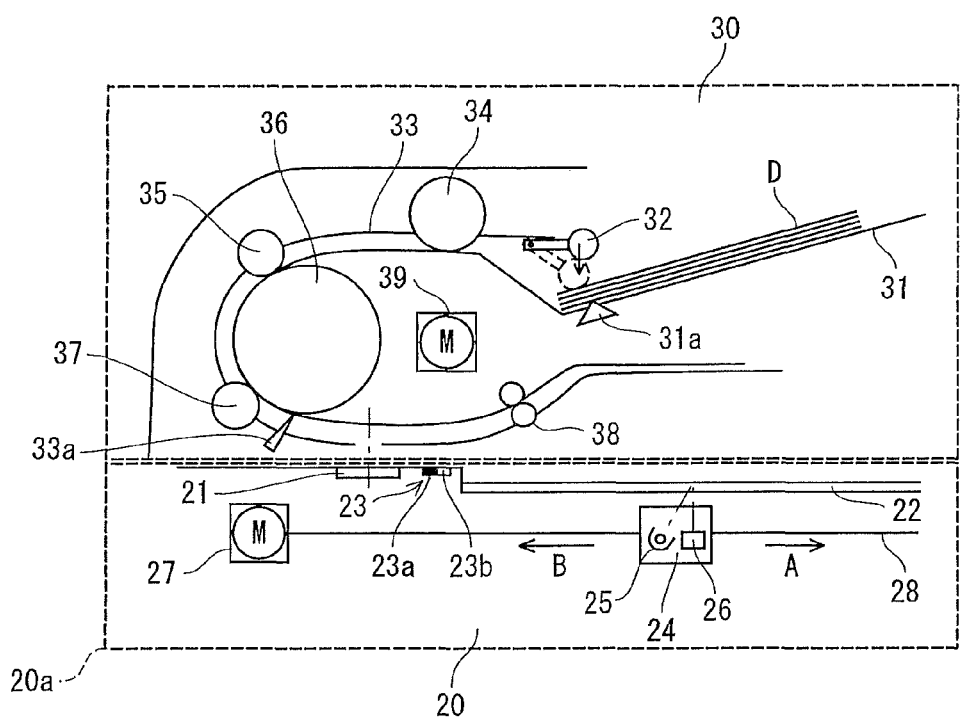
FIG. 2 is a schematic view showing the major part of the image reading apparatus included in the image forming apparatus shown in FIG. 1.

FIG. 2 is a schematic view showing the configuration of the scanner unit 20 and the ADF 30. The ADF 30 has a document placement table 31 for holding a plurality of document sheets D placed thereon. The document placement table 31 also has a document sensor 31a for detecting whether any document sheet D is placed on the document placement table 31. The document sheets D placed on the document placement table 31 are send one by one by a pickup roller 32 into a transport path 33, so that each document sheet D is transported along the outer circumferential surface of a platen roller 36. The pickup roller 32 is movable between the upper position, which is the rest position, to the lower position, which is the document feed position. To feed a document sheet D into the transport path 33, the pickup roller 32 is moved from the rest position down to the document feed position where the pickup roller 32 makes contact under pressure with the surface of the document sheet D placed on the document placement table 31.

On the transport path 33, a registration roller 34 is disposed to carry the document sheet D fed by the pickup roller 32 to a platen roller 36. Disposed above the platen roller 36 is a first transport roller 35 that is in contact under pressure with the outer circumferential surface of the platen roller 36. When the document sheet D carried by the registration roller 34 reaches a position between the first transport roller 35 and the platen roller 36, the document sheet D is further carried about half way along the outer circumferential surface of the platen roller 36. Disposed below the platen roller 36 is a second transport roller 37 that is in contact under pressure with the outer circumferential surface of the platen roller 36. When the document sheet D carried about half way along the outer circumferential surface of the platen roller 36 reaches a position between the second transport roller 37 and the platen roller 36, the document sheet D is further carried to pass between a pair of paper-discharge rollers 38 after passing over the position where the document image is read by the scanner unit 20 (hereinafter "document reading position"). Finally, the pair of paper-discharge rollers 38 ejects the document sheet D having passed over the document reading position onto a document sheet discharge tray (not shown).

Provided below the platen roller 36 is a registration sensor 33a for detecting a document sheet D being transported from the second transport roller 37 to the document reading position. In addition, the components of the ADF 30 such as the platen roller 36 are driven by an ADF drive motor 39.

The scanner unit 20 has a low-profile rectangular housing 20a that accommodates a carriage 24 having a linear light source 25 and an image sensor 26 both mounted thereon. The carriage 24 is disposed to reciprocate within the housing 20a in the first direction indicated by an arrow A and the second direction indicated by an arrow B (i.e., along the sub-scanning direction).

The carriage 24 has a shape elongated in the main-scanning direction, which is orthogonal to the sub-scanning direction, and is slidably supported at the longitudinally opposing edges thereof, by a pair of guide rails (not shown) that is disposed to extend in the sub-scanning direction within the housing 20a. The carriage 24 is configured to receive force resulting from forward and reverse rotation of an image reading motor 27 via a drive transmission unit 28 that includes a belt, wire, pulley, and the like. In response to the forward rotation of the image reading motor 27, the carriage 24 makes translatory motion in the first direction. In response to the reverse rotation of the image reading motor 27, on the other hand, the carriage 24 makes translatory motion in the second direction. As a result, the carriage 24 moves between the two opposing margins of the housing 20a in the sub-scanning direction. The image reading motor 27 is constructed of a pulse motor that operates under pulse control and moves the carriage 24 a specific distance that corresponds to the number of pulses of a driving signal.

The scanner unit 20 is provided with a contact glass (hereinafter "slit glass") 21 and a platen glass 22. The slit glass 21 is fit in a slit formed through the top wall of the housing 20a in a direction parallel to the main scanning direction. The slit glass 21 is located at a position corresponding to the document reading position that is upstream from the pair of paper-discharge rollers 38 in the transfer direction of document sheet D by the ADF 30. The document sheet D carried by the ADF 30 passes over the slit glass 21. The platen glass 22 is spaced a predetermined distance away from the slit glass 21 in the first direction and a document sheet to be read is placed on the platen glass 22.

The image sensor 26 mounted on the carriage 24 is constructed of a CCD (Charge Coupled Device) having a plurality of photoelectric conversion elements arranged along the main scanning direction. The linear light source 25 may be constructed of a xenon lamp, LED array, or the like disposed on the carriage 24 to extend linearly in parallel relation with the image sensor 26. The linear light source 25 emits light toward the document sheet that passes over the slit glass 21 or that is placed on the platen glass 22. Light reflected from the document sheet is received by the image sensor 26 via the slit glass 21 or the platen glass 22. Having received the reflected light, the image sensor 26 outputs image data indicative of the shading of the image of the document sheet. The resultant image data is subject to the shading correction conducted by an image processing unit 29 (FIG. 4) and converted into digital data.

Figure 3:
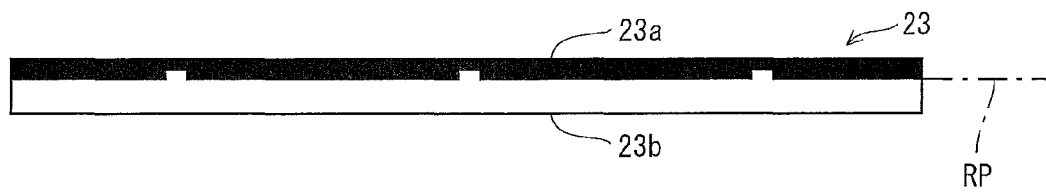
FIG. 3 is a bottom plan view of a reference pattern member having a reference pattern used by the image reading apparatus shown in FIG. 2.

Provided between the slit glass 21 and the platen glass 22 is a reference pattern member 23 having a reference pattern used for acquiring reference data for conducting shading correction on image data output from the image sensor 26. As shown in FIG. 3, the reference pattern member 23 generally has the shape of a planar rectangle that is substantially coextensive longitudinally with the linear light source 25 (i.e., having a substantially same length in the longitudinal direction). The reference pattern member 23 is disposed on the inner surface of the top wall of the housing 20a to extend in the main scanning direction entirely across the housing 20a, so that light emitted from the linear light source 25 is reflected back to image sensor 26 entirely along the longitudinal direction of the linear light source 25. The reference pattern formed on the reference pattern member 23 is divided into two adjacent areas by a boundary defined to extend substantially linearly in the main scanning direction. One of the two areas is a black reference area 23a located closer to the slit glass 21 and the other is a white reference area 23b located closer to the platen glass 22. The boundary between the black reference area 23a and the white reference area 23b is used as a reference position RP for positioning the carriage 24 at the home position.

At the time of shading correction, the image sensor 26 receives light reflected from the black reference area 23a and the white reference area 23b. In addition, as will be described later, the image sensor 26 detects the boundary between the black reference area 23a and the white reference area 23b as the reference position RP for positioning the carriage 24 at the home position. As described above, the boundary between the two reference areas 23a and 23b are substantially straight except at three equally spaced locations in the main scanning direction. At each of the three location, the white reference area 23b defines a convex that extends beyond the straight line into the black reference area 23a. This arrangement ensures that the image sensor 26 distinguishes the reference position RP from the image of a document sheet.

The carriage 24 is positioned at a predetermined home position HP (normal standby position) (see FIG. 5) when the power is turned ON as well as at the start of reading the image of a document sheet placed on the platen glass 22. The home position HP is located between the slit glass 21 and the reference pattern member 23. In order to read the image of a document sheet placed on the platen glass 22, the carriage 24 slides (i.e., makes translational movement) along the platen glass 22 in the first direction from the home position HP to travel a predetermined distance corresponding to the size of the document sheet. Subsequently, the carriage 24 slides in the second direction and thus is restored to the home position HP.

In order to read the image of a document sheet D that is fed to pass over the slit glass 21, the carriage 24 slides in the second direction from the home position HP and stops at the document reading position corresponding to whether the slit glass 21 is disposed (more precisely, the midpoint of the slit glass 21 in the width direction). At the time of the shading correction by the image sensor 26, the carriage 24 slides in the first direction from the home position HP and stops at a position below the reference pattern member 23. The image sensor 26 then separately reads the black reference area 23a and the white reference area 23b.

Figure 4:
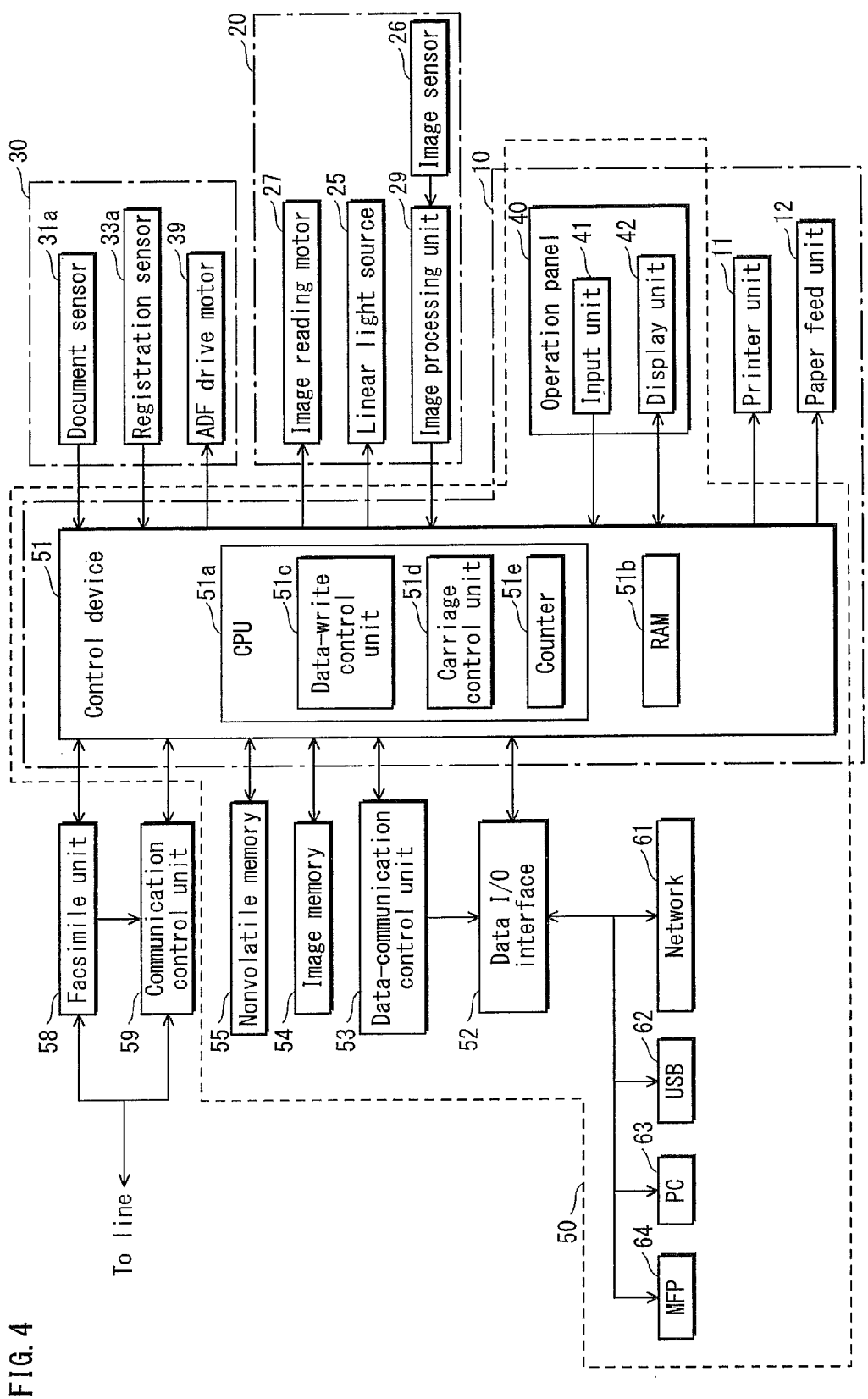
FIG. 4 is a block diagram showing the major part of a control system of the image forming apparatus shown in FIG. 1.

FIG. 4 is a block diagram showing the major part of the control system of the image forming apparatus. The image forming unit 10 of the image forming apparatus is provided with a control device 51 that includes a CPU 51a, RAM 51b, and the like. The control device 51 executes various controls, information processing, and the like. The control device 51 is configured to receive various data from a key input unit 41 that is provided as part of the operation panel 40. In addition, the control device 51 controls the display unit 42 that is provided as part of the operation panel 40.

The control device 51 is connected to a data input/output interface (hereinafter, data I/O interface) 52 for communicating input and output data. The data I/O interface 52 has a LAN terminal for connection with an external network 61, a USB terminal for connection with an USB 62, and parallel and serial interface terminals for connection with a personal computer (PC) 63 and various peripheral devices, such as another MFP 64. Under control by the control device 51, a data communication control unit 53 sends and receives data such as e-mail to or from the respective devices connected to the terminals of the data I/O interface 52.

The control device 51 is also connected to: the image processing unit 29 that converts data output from the image sensor 26 included in the scanner unit 20 into digital data; an image memory 54 for storing image data output from the image processing unit 29 as well as image data acquired via the data I/O interface 52; and a nonvolatile memory 55 for storing current location information, which will be described later. Further, the control device 51 is connected to a facsimile unit 58 for generating facsimile data and a communication control unit 59 for controlling transfer of the facsimile data generated by the facsimile unit 58 to or from a public telephone line.

The control device 51 comprises an information processing unit 50. The information processing unit 50 also includes the key input unit 41, the display unit 42, the data I/O interface 52, the data-communication control unit 53, the image memory 54, and the nonvolatile memory 55 all of which are connected to the control device 51 and also includes the network 61 and other components connected to the data I/O interface 52.

The control device 51 controls the image reading motor 27 of the scanner unit 20 to move the carriage 24 to a location below the slit glass 21. Further, the control device 51 controls the ADF drive motor 39 of the ADF 30 to cause a document sheet D placed on the document placement table 31 to pass over the slit glass 21 of the scanner unit 20, so that the image sensor 26 is enabled to read the image of the document sheet D fed by the ADF 30. Still further, the control device 51 controls the image reading motor 27 of the scanner unit 20 to cause the carriage 24 to pass below the platen glass 22, so that the image sensor 26 is enabled to read the image of a document sheet placed on the platen glass 22.

Image data output from the image sensor 26 is digitized by the image processing unit 29. At the time of shading correction, the control device 51 moves the carriage 24 to a position below the reference pattern member 23, so that the image sensor 26 is enabled to read the black reference area 23a and the white reference area 23b of the reference pattern formed with the reference pattern member 23.

The control device 51 also controls the printer unit 11 and the paper feed unit 12 included in the image forming unit 10 to form a toner image on a recording sheet by a conventional electrographic method, based on image data processed by the image processing unit 29 or image data stored in the image memory 54.

Further, the control device 51 includes a carriage control unit 51d, a data-write control unit 51c, and a counter 51e. The carriage control unit 51d executes control for positioning the carriage 24 included in the scanner unit 20 at the home position. The data-write control unit 51c executes control for writing, into the nonvolatile memory 55, predetermined information necessary for the positioning control. The counter 51e is for counting the number of pulses of a control signal supplied to control the image reading motor 27 that moves the carriage 24.

Figure 5:
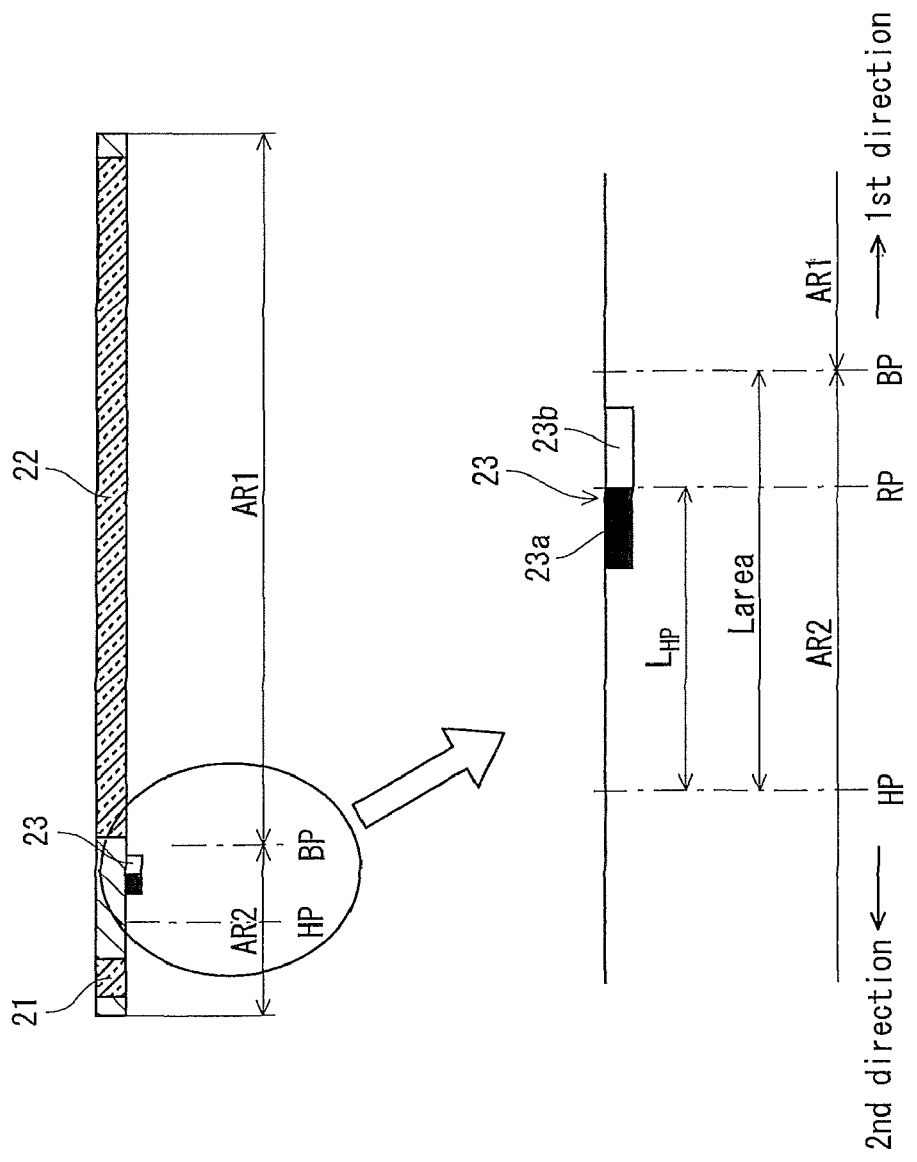
FIG. 5 is a schematic view illustrating a control procedure performed by the image reading apparatus according the present invention for positioning a carriage at a home position.

The following now describes a control method for positioning the carriage 24 at the home position, with reference to a schematic view shown in FIG. 5. The home position HP is located between the reference pattern member 23 and the slit glass 21 and a predetermined distance $L_{HP}$ away in the second direction from the reference position RP. As described above, the reference position RP is defined in advance at a location coinciding with the boundary between the black reference area 23a and the white reference area 23b of the reference pattern member 23.

In addition, a first area AR1 and a second area AR2, and a boundary BP between the first and second areas AR1 and AR2 are defined in advance. With reference to the boundary BP, the current location information indicating the current location of the carriage is acquired at the time of positioning the carriage at the home position HP. The boundary BP is defined to coincide with a location that is a predetermined distance away from the reference position RP in the first direction. With respect to the boundary BP, the first area AR1 is located on the side toward the first direction and the second area AR2 toward the second direction. The boundary BP may coincide with the reference position RP of the reference pattern member 23 or with a location away from the reference position RP in the first direction. Although not specifically limited, the boundary BP according to the present embodiment is defined to coincide with a location between the reference pattern member 23 and the platen glass 22, where the carriage 24 moving in the first direction reaches immediately after passing the reference pattern member 23. That is to say, the boundary BP is defined to coincide with such a location where the edge of the carriage 24 toward the second direction coincides with the edge of the reference pattern member 23 toward the first direction. The distance between the home position HP and the boundary BP is designated as $L_{area}$.

The nonvolatile memory 55 has stored therein the current location information indicating whether the carriage 24 is located in the first area AR1 or the second area AR2. The current location information is initially set at the time of in-plant test before the image forming apparatus is shipped. For example, in the case where the carriage 24 is located within the first area AR1 at the time of the in-plant test, the nonvolatile memory 55 is set to store the initial value "0". On the other hand, in the case where the carriage 24 is located within the second area AR2, the nonvolatile memory 55 is set to store the initial value "1".

The control device 51 further includes the data-write control unit 51c for detecting that the carriage 24 moves from the first area AR1 to the second area AR2 across the boundary BP, and vice versa. Each time such a movement of the carriage 24 is detected, the control device 51 overwrites the value held in the nonvolatile memory 55. More specifically, on detecting that the carriage 24 moves into the first area AR1 across the boundary BP, the data-write control unit 51c changes the value from "1" to "0". On detecting that the carriage 24 moves into the second area AR2 across the boundary BP, the data-write control unit 51c changes the value from "0" to "1".

The carriage control unit 51d included in the control device 51 outputs a driving signal to the image reading motor 27 in order to rotatably drive the image reading motor 27 in the forward or reverse direction under pulse control. The counter 51e counts the number of pulses of the driving signal. The carriage control unit 51d resets the counter 51e to "0" each time the carriage 24 is positioned at the home position HP. The carriage control unit 51d counts up the number of pulses upon receipt of a driving signal for causing the reading motor 27 to rotate in forward thereby to move the carriage 24 in the first direction. On the other hand, the carriage control unit 51d counts down the number of pulses upon receipt of a driving signal for rotatably drive the reading motor 27 in the reverse direction thereby to move the carriage 24 in the second direction. Thereafter, the counter 51e counts up or down the number of pulses of a driving signal supplied to the image reading motor 27 to move the carriage 24 in various processes such as image reading and shading correction.

The control unit 51 stores the values of $PCOUNT_{area}$ and $PCOUNT_{HP}$ determined in advance. The predetermined value of $PCOUNT_{area}$ indicates the number of pulses included in a driving signal necessary for driving the image reading motor 27 to move the carriage 24 the distance $L_{area}$, which is equal to the distance from the home position HP to the boundary BP between the first area AR1 and the second area AR2. The predetermined value of $PCOUNT_{HP}$ indicates the number of pulses included in a driving signal necessary for driving the image reading motor 27 to move the carriage 24 the distance $L_{HP}$, which is equal to the distance from the reference position RP to the home position HP.

The data-write control unit 51c detects that the carriage 24 moves across the boundary BP, with reference to the predetermined value $PCOUNT_{area}$ and the actual count value $PCOUNT_{IRM}$ of the counter 51e kept during the time the carriage 24 is on the move. Upon detecting such a movement, the data-write control unit 51c accordingly rewrites (i.e., updates) the current location information held in the nonvolatile memory 55. More specifically, as long as the actual count value $PCOUNT_{IRM}$ of the counter 51e is equal to or smaller than the predetermined value $PCOUNT_{area}$, which is the number of pulses corresponds to the distance $L_{area}$ from the home position HP to the boundary BP ($PCOUNT_{IRM} \leq PCOUNT_{area}$), it is judged that the carriage 24 is currently located in the second area AR2. On the other hand, if $PCOUNT_{IRM} > PCOUNT_{area}$, it is judged that the carriage 24 is currently located in the first area AR1.

The image forming apparatus having the above configuration, immediately after power-ON, the positioning control is executed by the carriage control unit 51d based on the current location information held in the nonvolatile memory 55, so that the carriage 24 is brought to the home position HP. More specifically, first, the image reading motor 27 is rotatably driven in the forward or reverse direction according to the current location information, so that the carriage 24 is moved to the reference position RP. The detailed description of the control for moving the carriage 24 to the reference position RP according to the current location information will be given later.

Once the carriage 24 is moved to the reference position RP, the image reading motor 27 is driven to bring the carriage 24 to the home position HP. Here, the control device 51 issues such a driving signal that rotatably drives the image reading motor 27 in the reverse direction for a rotation amount corresponding to the predetermined number of pulses PCOUNT$_{HP}$. As a consequence, the image reading motor 27 is rotatably driven in reverse to move the carriage 24 the predetermined distance in the second direction, so that the carriage 24 is positioned at the home position HP.

Figure 6:
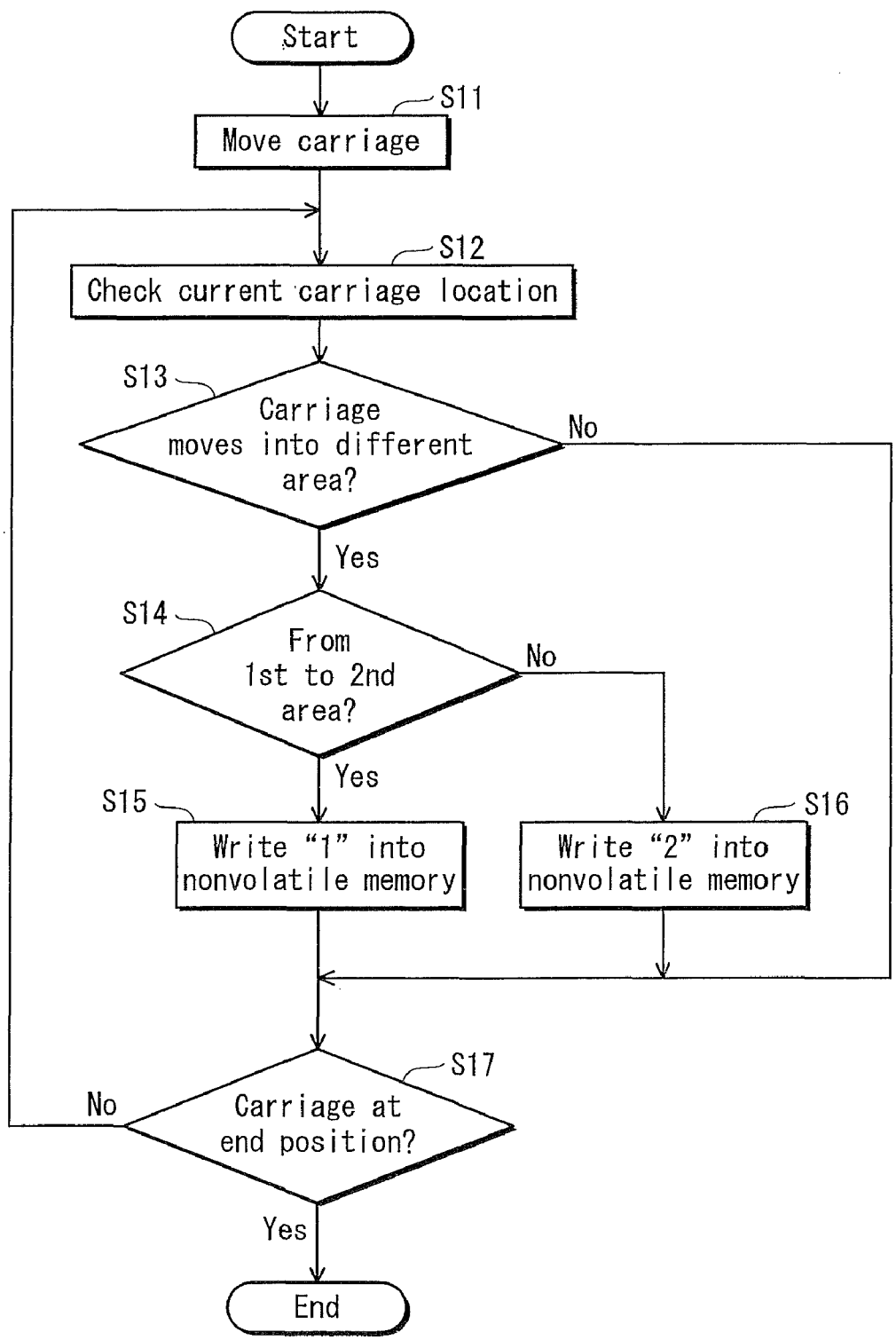
FIG. 6 is a flowchart illustrating a control procedure performed by the image reading apparatus according the present inventing for rewriting current location information of the carriage.

FIG. 6 is a flowchart illustrating the control procedure performed by the data-write control unit 51c included in the control device 51 for rewriting the current location information held in the nonvolatile memory 55. When the carriage 24 starts moving in any of various processes such as image reading and shading correction (Step S11 shown in FIG. 6 and the steps indicated below also refer to FIG. 6), the data-write control unit 51c repeats the series of Steps S12-S17 at a predetermined time interval, such as tens of milliseconds, until the carriage 24 comes to stop.

First, in Step S12, the count value PCOUNT$_{IRM}$ of a pulses included in a driving signal counted by the counter 51e is compared with the predetermined value PCOUNT$_{area}$ to check whether the carriage 24 is currently located in the first area AR1 or the second area AR2 (Step S12). Then, the data-write control unit 51c judges whether the current location of the carriage 24 checked in Step S12 disagrees with the current location information held in the nonvolatile memory 55 (Step S13). If the carriage 24 has moved across the boundary BP and thus is now located in the different area (Step S13: YES), the data-write control unit 51c goes onto Step S14 in order to rewrite (i.e., update) the current location information held in the nonvolatile memory 55 and checks whether the carriage 24 has moved from the first area AR1 to the second area AR2 (Step S14).

That is, if the count value PCOUNT$_{IRM}$ of the counter 51e is equal to or smaller than the predetermined number of pulses PCOUNT$_{area}$ (PCOUNT$_{IRM}$≦PCOUNT$_{area}$), it is judged that the carriage 24 has moved from the first area AR1 to the second area AR2, which means the current location of the carriage 24 is in the second area AR2. On the other hand, if the count value PCOUNT$_{IRM}$ of the counter 51e is larger than the predetermined number of pulses PCOUNT$_{area}$ (PCOUNT$_{IRM}$>PCOUNT$_{area}$), it is judged that the carriage 24 has moved from the second area AR2 to the first area AR1, which means that the current location of the carriage 24 is in the first area AR1.

On judging that the carriage 24 has moved from the first area AR1 to the second area AR2 (Step S14: YES), the data-write control unit 51c writes "1" as the current location information into the nonvolatile memory 55 (Step S15). On judging that the carriage 24 has moved from the second area AR2 to the first area AR1 (Step S14: NO), the data-write control unit 51c writes "0" as the current location information into the nonvolatile memory 55 (Step S16). Then, the processing goes onto Step S17 to repeat the series of Steps S11-S16 until the carriage 24 comes to stop.

Through the above processing steps, while the carriage 24 is on the move, the current location information held in the nonvolatile memory 55 is updated each time the carriage 24 moves across the boundary BP. Thus, it is ensured that the nonvolatile memory 55 constantly store the most up-to-date current location information. In addition, the current location information held in the nonvolatile memory 55 is updated only when the value of the counter 51e is changed to indicate that the carriage 24 has moved across the boundary BP. This eliminates the need for updating the current location information stored the nonvolatile memory 55 each time the count value of the counter 51e is incremented or decremented during the time the carriage 24 is on the move, which means that the number of times of rewriting nonvolatile memory 55 is reduced.

Figure 7:
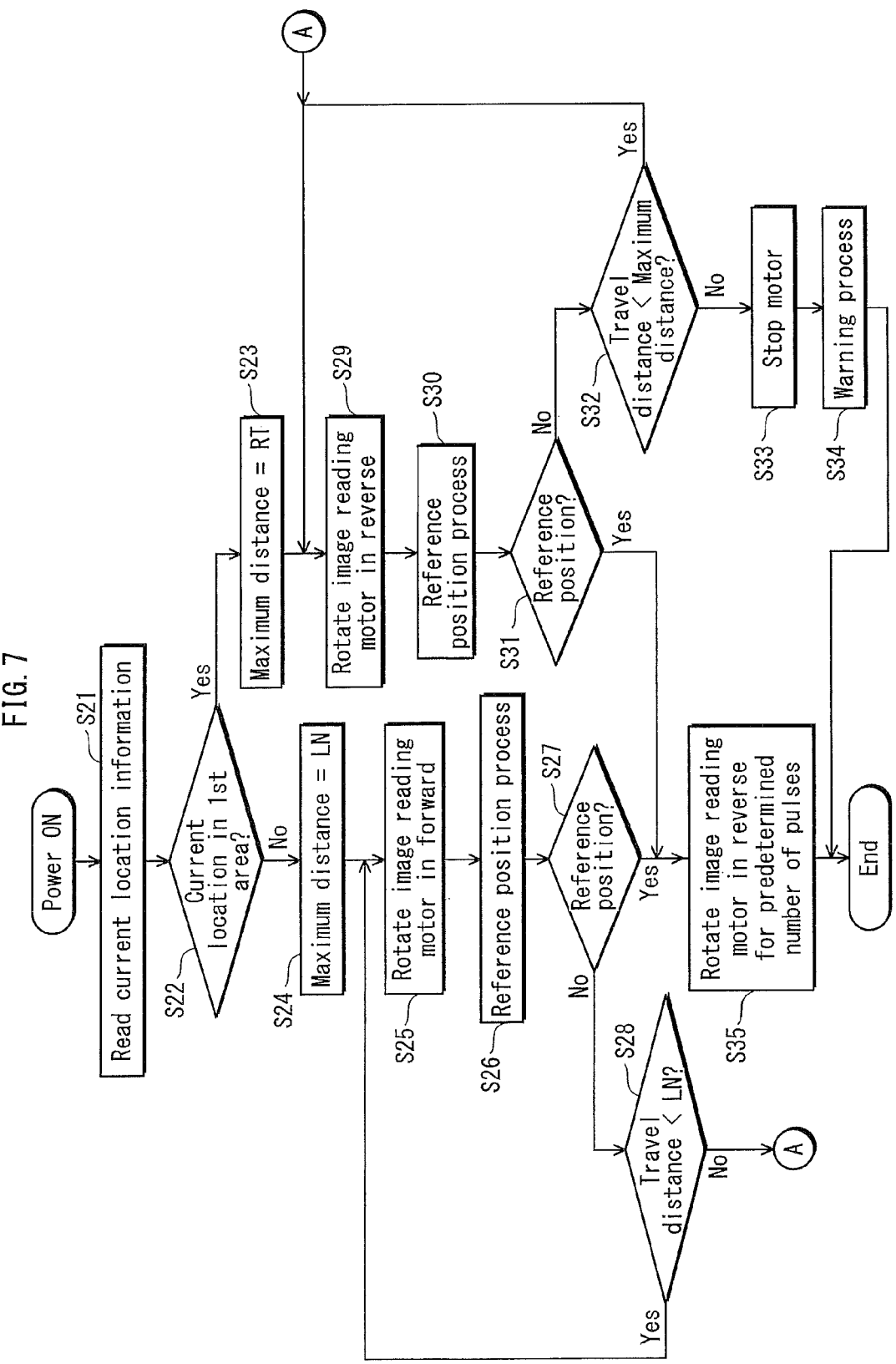
FIG. 7 is a flowchart illustrating the control procedure performed by the image reading apparatus according the present invention for positioning the carriage at the home position

Next, the following describes, with reference to a flowchart shown in FIG. 7, the control procedure performed by the carriage control unit 51d for positioning the carriage 24 at the home position HP immediately after the image forming apparatus is turned ON. When the image forming apparatus is switched from the OFF state to the ON state, the carriage control unit 51d reads the current location information from the nonvolatile memory 55 (Step S21 shown in FIG. 7 and the steps indicated below also refer to FIG. 7) and checks whether the carriage 24 is currently located within the first area AR1 based on the value of the read current location information (Step S22). If the current location information indicates the value "0", the carriage control unit 51d judges that that the carriage 24 is currently located in the second area AR2 (Step S22: NO). Accordingly, the carriage control unit 51d sets a distance LN as the maximum travel distance that the carriage 24 located in the second area AR2 needs to travel at maximum (i.e., in the case where the carriage 24 is located freshest within the second area AR2) to reach a location where the image sensor 26 is enabled to detect the reference pattern of the reference pattern member 23 (Step S24). The maximum travel distance LN set in Step S24 is equal to a distance between the margin 20b of the second area AR2 toward the second direction (see FIG. 8) and the edge of the reference pattern of the reference pattern member 23 toward the first direction. Note that the value of the maximum travel distance LN is not limited to be equal the distance described above and may alternatively be set to be equal to the entire length of the second area AR2 instead.

If the current location information indicates the value "1", it is judged that the carriage 24 is currently located in the first area AR1 (Step S22: YES). Accordingly, the carriage control unit 51d sets a distance RT as the maximum travel distance that the carriage 24 currently located in the first area AR1 needs to travel at maximum to reach a location where the image sensor 26 is enabled to detect the reference pattern of the reference pattern member 23 (Step S23). The maximum travel distance RT set in Step S23 is equal to a distance between the margin 20c of the first area AR1 toward the first direction (see FIG. 8) and the edge of the reference pattern of the reference pattern member 23 toward the second direction. Once the maximum travel distance RT is set, the processing goes onto Step S29 where the carriage 24 is moved from the first area AR1 to the home position HP. The details of this control procedure will be given later.

Once the distance LN is set in Step S24 as the maximum travel distance that the carriage located within the second area AR2 needs to travel at maximum, the carriage control unit 51d turns ON the linear light source 25 and rotatably drives the image reading motor 27 in the forward direction (Step S25). As a result, the carriage 24 is moved in the first direction and a reference position process is performed (Step S26).

In the reference position process, the carriage control unit 51d confirms that the carriage 24 is located at the reference position RP, if the output of the image sensor 26 is changed from a signal corresponding to the black reference area 23a to a signal corresponding to the white reference area 23b (Step S27). Once it is confirmed that the carriage 24 is located at the reference position RP (Step S27: YES), the image reading motor 27 is rotatably driven as described above in the reverse direction for the rotation amount corresponding to the predetermined number of pulses PCOUNT$_{HP}$ (Step S35), with respect to the count value held by the counter 51e at the time of confirming that the carriage 24 is located at the reference position RP. As a result, the carriage 24 is moved (i.e., slides) the distance L$_{area}$ from the reference position RP in the second direction. As a result, the carriage 24 is positioned at the home position HP. Once the positioning of the carriage 24 is done, the linear light source 25 is turned OFF.

On the other hand, if the image sensor 26 fails to detect the reference pattern of the reference pattern member 23 and thus the carriage 24 cannot be confirmed to be located at the reference position RP (Step S27: NO), it is then judged whether or not the carriage 24 has moved in the first direction the maximum travel distance LN that is set in Step S24 (Step S28). If it is judged that the carriage 24 has not moved to fully cover the maximum travel distance LN (travel distance<LN, Step S28: YES), the processing goes back to Step S25 to continue the rotational driving of the image reading motor 27 in the forward direction in order to continue the reference position process.

If it is judged that the carriage 24 has moved in the first direction to fully cover the maximum travel distance LN and yet the image sensor 26 is still unable to detect the reference pattern of the reference pattern member 23 to ensure that the carriage 24 is at the reference position (Step S28: NO), it is assumed that the carriage 24 at the time of power-ON was located between the reference position PR and the boundary BP. In such a case, the processing goes onto Step S29 where the image reading motor 27 is driven to rotate in reverse (Step S29). As a result of the reverse rotation, the carriage 24 is reversed into the second direction.

As a result of the reverse movement of the carriage 24 into the second direction, the reference position process is performed based on output of the image sensor 26 to detect the reference pattern of the reference pattern member 23 (Step S30), so that it is checked whether that the carriage 24 is moved to the reference position RP (Step S31). If it is confirmed that the carriage 24 has moved to the reference position PR (Step S31: YES), the processing goes onto Step S35 where the image reading motor 27 is driven to rotate in reverse for the amount corresponding to the predetermined number of pulses PCOUNT$_{HP}$. As a result of the reverse rotation, the carriage 24 is moved to the home position HP.

On the other hand, if the image sensor 26 fails detect the reference pattern of the reference pattern member 23 and the carriage 24 cannot be located at the reference position (Step S31: NO), it is then judged whether or not the travel distance is smaller than the maximum travel distance (Step S32). The maximum travel distance mentioned herein is the distance LN set in Step S24. If the travel distance<the maximum travel distance LN (Step S32: YES), the processing goes back to Step S29 to continue the reverse rotational driving of the image reading motor 27 and also to continue the reference position process in Step S30.

Even after the repetition of the series of Steps S29-S30 to move the carriage 24 the maximum travel distance LN, if the image sensor 26 is still unable to detect the reference pattern of the reference pattern member 23 and not positioned at the reference position RP (Step S32: NO), it is then judged that trouble develops and thus stops the drive of the image reading motor 27 (Step S33), so that the carriage 24 comes to stop. Subsequently, a warring process is performed to warn that the carriage 24 is not positioned at the home position HP (Step S34). The warning may be made by flashing a warning lamp, for example.

Next, the following describes a process performed after Step S29, in the case where it is judged in Step S22 that the carriage 24 at the time of power-ON is located within the first area AR1 (Step S22: YES) and the distance RT is set as the maximum travel distance of the carriage 24.

If it is judged that the carriage 24 is located in the first area AR1 and thus the distance RT is set as the maximum travel distance, the image reading motor 27 is driven to rotate in reverse to move the carriage 24 in the second direction (Step S29). Then, the image sensor 26 detects the reference pattern of the reference pattern member 23 to perform the reference position process (Step S30). Through the reference position process, it is checked whether or not the carriage 24 is located at the reference position (Step S31).

If it is confirmed that the carriage 24 is located at the reference position RP (Step S31: YES), the processing goes onto Step S35 where, as described above, the image reading motor 27 is driven to rotate in reverse by the amount corresponding to the predetermined number of pulses PCOUNT$_{HP}$. As a result of this reverse rotation, the carriage 24 is moved the predetermined distance L$_{area}$ in the second direction to be sit at the home position HP.

On the other hand, if the detection of the reference pattern of the reference pattern member 23 by the image sensor 26 cannot be confirmed (Step S31: NO), it is then judged whether the travel distance is shorter than the maximum travel distance (Step S32). The maximum travel distance mentioned herein is the distance RT set in Step S23. If it is judged that the travel distance of the carriage 24 is shorter than the maximum travel distance RT, the processing goes back to Step S29 to continue the reverse rotational driving of the image reading motor 27.

On the other hand, if the travel distance of the carriage 24 has reached the maximum travel distance RT (Step S32: NO), it means that the carriage 24 has moved the maximum travel distance RT and yet the image sensor 26 is still unable to detect the reference pattern of the reference pattern member 23. Thus, it is judged trouble has occurred and stops driving the image reading motor 27 (Step S33). Subsequently, the predetermined warning process is performed (Step S34). This concludes the description of the control procedure performed by the carriage control unit 51*d* for positioning of the carriage 24 at the home position HP.

Figure 8:
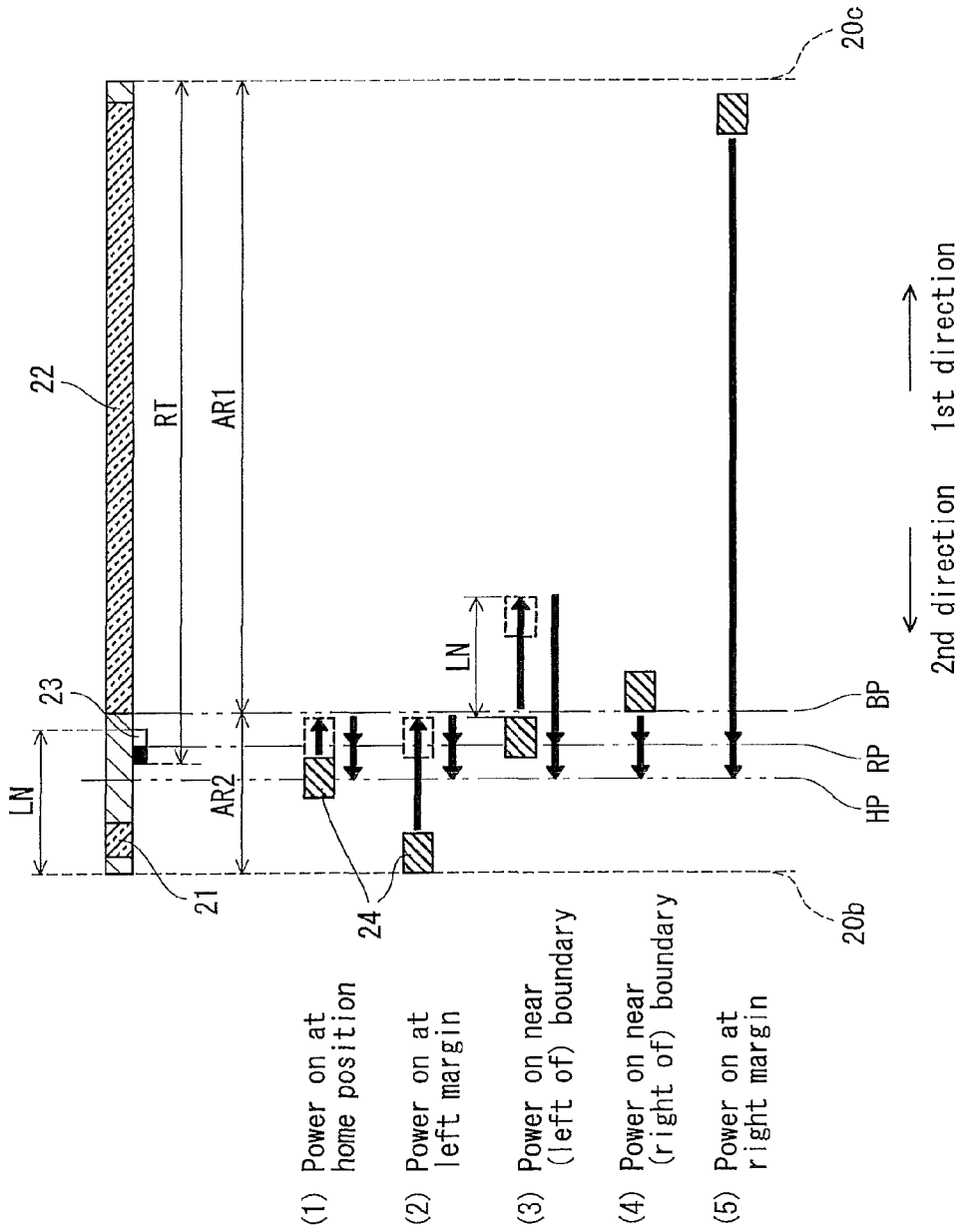
FIG. 8 is a schematic view for illustrating the control procedure shown in the flowchart of FIG. 7.

FIG. 8 is a schematic view for illustrating the control procedure shown in the flowchart of FIG. 7 for the positing of the carriage 24 at the home position HP. In FIG. 8, the portion of the figure denoted by (1) indicates the movement of the carriage 24 to be made at the time when the image forming apparatus is turned on, with the carriage 24 located in the vicinity of the home position HP and in the second area AR2. In this case, by the forward rotational driving of the image reading motor 27 (Step S25 shown FIG. 7 and the steps indicated below also refer to FIG. 7), the carriage 24 is moved in the first direction to the reference position RP (Step S27: YES). Subsequently, the image reading motor 27 is driven to rotate in reverse by the amount corresponding to the predetermined number of pulses, so that the carriage 24 is positioned at the home position HP (Step S35).

The portion of FIG. 8 denoted as (2) indicates the movement of the carriage 24 to be made at the time when the image forming apparatus is turned on, with the carriage 24 located at the outermost end (left margin) 20*b* of the second area AR2 toward the second direction. In this case, as a result of the forward rotation of the image reading motor 27 by the amount corresponding to the predetermined number of pulses (Step S25 shown in FIG. 7), the carriage 24 is moved in the first direction to the reference position RP (Step S27: YES). Subsequently, as a result of the reverse rotational deriving of the image reading motor 27 by the amount corresponding to the predetermined number of pulses, the carriage 24 is further moved to the home position HP (Step S35).

The portion of FIG. 8 denoted as (3) indicates the movement of the carriage 24 to be made at the time when the image forming apparatus is turned on, with the carriage 24 located in the vicinity of the boundary BP and within the second area AR2. In this case, as a result of the forward rotation of the image reading motor 27 (Step S25), the carriage 24 is moved in the first direction to cover the maximum travel distance LN (Step S28: NO). Then, the image reading motor 27 is driven to rotate in reverse (Step S29) to reversely move the carriage 24 to the reference position RP (Step S31: YES). Finally, the image reading motor 27 is driven to rotate in reverse by the amount corresponding to the number of pulses, so that the carriage 24 positioned at the home position HP (Step S35).

The portion of FIG. 8 denoted as (4) indicates the movement of the carriage 24 to be made at the time when the image forming apparatus is turned on, with the carriage 24 located in the vicinity of the boundary BP and within the first area AR1. In this case, by the reverse rotation of the image reading motor 27 (Step S22: YES, Step S23, and Step S29), the carriage 24 is moved in the second direction to the reference position RP (Step S31: YES). Then, by the reverse rotation of the image reading motor 27 driven in response to the predetermined number of pulses, the carriage 24 is brought to the home position HP (Step S35).

The portion of FIG. 8 denoted as (5) indicates the movement of the carriage 24 to be made at the time when the image forming apparatus is turned on, with the carriage 24 located at the outermost end (right margin) 20c of the first area AR1 toward the first direction. In this case, similarly to (4) of FIG. 8 above, the image reading motor 27 is driven to rotate in reverse (Step S22: YES, Step S23, and Step S29), so that the carriage 24 is brought to the home position HP.

As described above, the present embodiment ensures the positioning of the carriage 24 at the home position HP, without employing a sensor or the like to detect that the carriage 24 is located at the home position HP. More specifically, the present embodiment uses the reference pattern member 23, which is provided for the shading correction, to reliably bring the carriage 24 to the home position HP without the risk that the carriage 24 collides against the side walls (margins) 20b and 20c of the housing 20a, irrespective of where the carriage 24 at the time of power ON is located between the two opposite margins 20b and 20c of the housing 20a toward the first and second direction.

Note that according to the above embodiment, the boundary BP is set to fall at a location between the reference pattern member 23 and the platen glass 22 and in the vicinity of the reference pattern member 23. With this arrangement, even when located in the first area AR1, the carriage 24 is moved to the reference position RP by traveling a relatively short distance. Thus, the positioning is effectively made to bring the carriage 24 to the home position HP.

On the other hand, however, by setting the boundary BP in the vicinity of the reference pattern member 23, the following risk may arise. Suppose, for example, that the power is turned off while the carriage 24 is on the move in the second direction and immediately before reaching the reference position RP. In such a case, the carriage 24 may pass the reference position RP and into the second area AR2 due to inertia force. Yet, the current location information held in the nonvolatile memory 55 is left unchanged and thus indicates the first area AR1. As a result, the current location information disagrees with the actual carriage location.

Further, there is another risk that when the carriage 24 is moved in the first direction with an intention to be stopped at the reference position RP. Yet, due to inertia force, the carriage 24 may undesirably pass the boundary BP. In this case, the current location information held in the nonvolatile memory 55 is duly updated so that the disagreement does not occur but the that the nonvolatile memory 55 is rewritten for an extra number of times.

Figure 9:
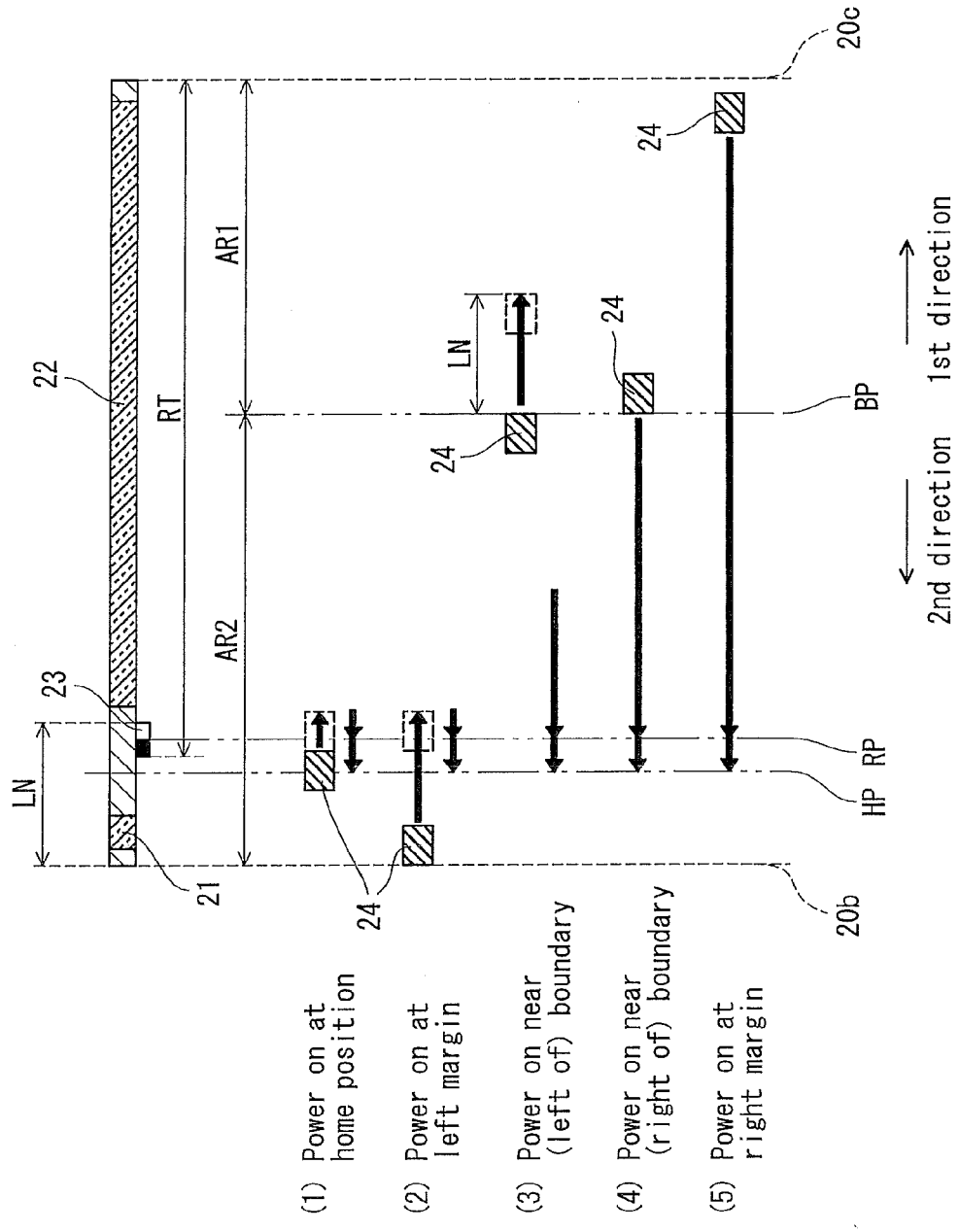
FIG. 9 is a schematic view illustrating another control procedure performed by the image reading apparatus according the present invention for positioning the carriage at the home position.

In order to avoid the risks noted above, the boundary BP may be set at a location at or in the vicinity of a midpoint of the platen glass 22 in the sub-scanning direction as shown in FIG. 9. This configuration eliminates the risk that the carriage 24 passes the boundary BP due to inertia force. It is therefore avoided that the current location information held in the nonvolatile memory 55 disagrees with the actual position of the carriage 24 as well as that the current location information on the nonvolatile memory 55 is rewritten too frequently.

FIG. 9 illustrates how the carriage 24 is moved upon power-ON of the image forming apparatus having the above configuration. As long as the carriage 24 at the time of power-ON is located at the home position HP as denoted by (1) in FIG. 9, at an edge (left margin) 20b of the second area AR2 toward the second direction as denoted by (2) in FIG. 9, and at an edge (right margin) 20c of the first area AR1 toward the first direction as denoted by (5) in FIG. 9, the carriage 24 is moved in the way similar to that denoted by (1), (2) and (5) in FIG. 8, respectively. Yet, if the carriage 24 at the time of power-ON is located at a position in the second area AR2 and in the vicinity of the boundary BP as denoted by (3) in FIG. 9, the carriage 24 is first moved the maximum travel distance LN in the first direction and then reversed in the second direction to the reference position RP, which means that the carriage 24 travels a longer or extra distance.

In addition, as denoted by (4) in FIG. 9, in the case where the carriage 24 is located in the first area AR1, the carriage 24 needs to travel a slightly longer distance to reach the reference position RP, than the distance denoted by (4) in FIG. 8. Naturally, the time taken to position the carriage 24 at the home position HP is slightly longer, which means the positioning efficiency slightly decreases.

Figure 10:
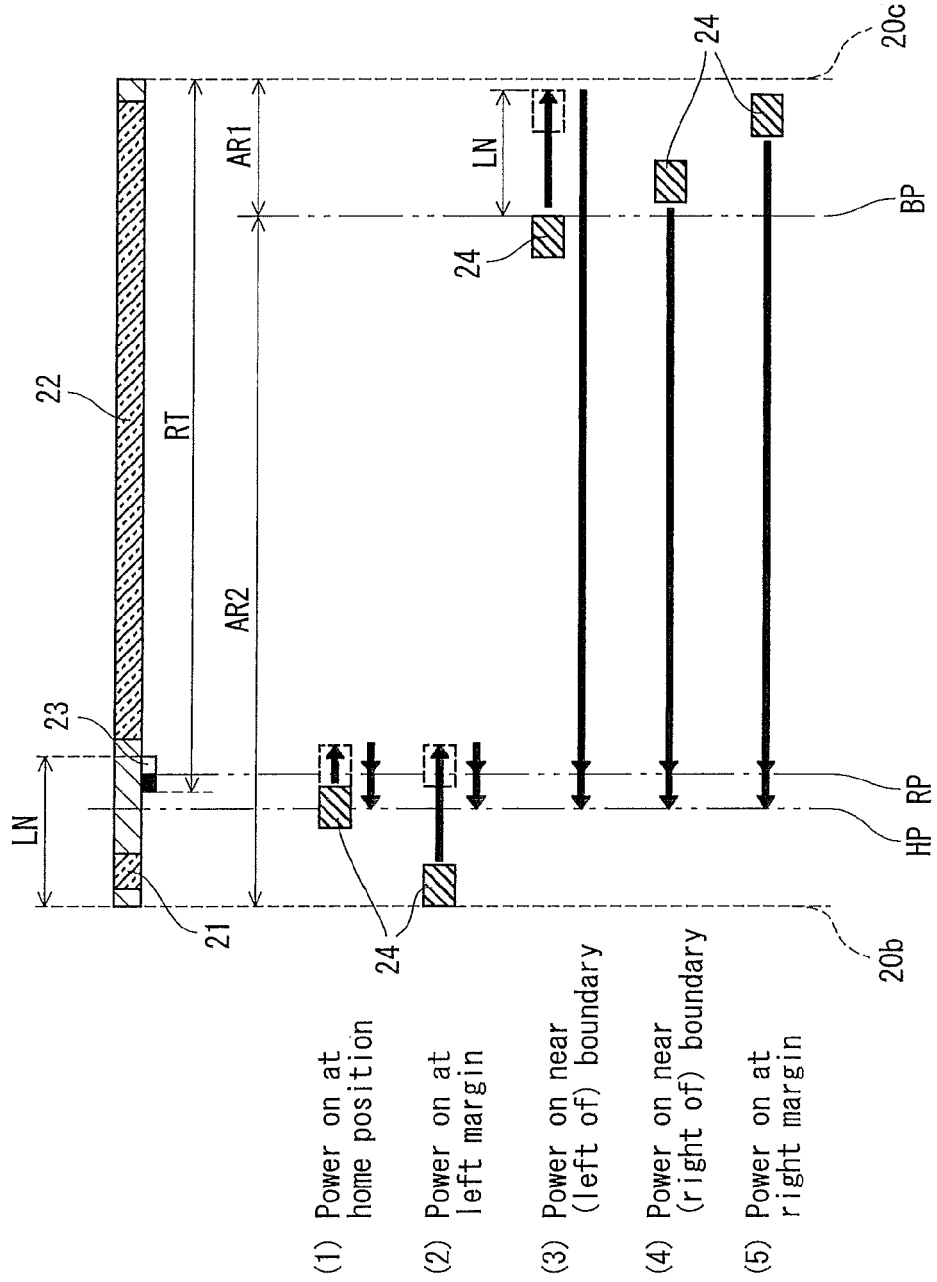
FIG. 10 is a schematic view illustrating yet another control procedure performed by the image reading apparatus according the present invention for positioning the carriage at the home position.

Note that the location of the boundary BP is not limited to the midpoint of the platen glass 22 in the sub-scanning direction. Alternatively, as shown in FIG. 10, the boundary BP may be set at a location that is shifted in the first direction from the midpoint of the platen glass 22 in the sub-scanning direction. With this arrangement, however, the length of the first area AR1 in the sub-scanning direction needs to be set longer than the maximum travel distance LN that the carriage 24 is allowed to move in the second area AR2, as denoted by (3) in FIG. 10. This is to eliminate the risk that the carriage 24 moved in the first direction would collide against the inner side wall 20c of the housing 20a.

Yet, regarding this arrangement, the following should be noted. In the case where the carriage 24 is located within the first area AR1 (denoted by (3) and (4) in FIG. 10), the carriage 24 needs to travel a longer distance to reach the reference position RP, than indicated by (3) and (4) in FIG. 9, which further increase the travel time of the carriage 24.

The above embodiment describes the positioning of the carriage 24 at the home position that is performed when the power is turned ON. However, the positioning control may be performed immediately before moving the carriage 24 in the first direction to read the image of a document sheet placed on the platen glass 22.

Further, the present invention is not limited to the configuration that the carriage 24 is mounted on the image sensor 26. For example, the image sensor 26 may be fixed inside the housing 20a, and the linear light source 25 and a first reflecting mirror may be both mounted on a first the carriage. In addition, a pair of second and third reflecting mirrors may be mounted on a second carriage. The first and second carriages are configured to move at respective speeds determined in advance, so that part of the emission light of the linear light source that is reflected from the document sheet is guided to the image sensor 26 by the first reflecting mirror mounted on the first the carriage and the second and third reflecting mirrors mounted on the second the carriage.

Further, an image forming apparatus according to the present invention is not limited to an MFP (Multiple Function Peripheral) having the ADF 30. An image forming apparatus embodying the present invention may be configured without the ADF 30 and thus without the slit glass 21. Still further, an image forming apparatus embodying the present invention is not limited to an MFP and may be any other device and apparatus, such as a copier and a facsimile

INDUSTRIAL APPLICABILITY

The present invention is applicable to an image reading apparatus includes a carriage having a linear light source and an image sensor disposed in parallel to the linear light source. The linear light source emits light onto a surface of a document sheet placed on a platen glass and the image sensor receives light reflected from the surface of the document sheet. The image reading apparatus is capable of positioning the carriage at the home position, without employing a home position sensor.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading apparatus comprising:
a carriage having a linear light source operable to emit light onto a surface of a document sheet placed on a platen glass;
an image sensor operable to receive part of the emission light reflected from the surface of the document sheet;
a carriage drive mechanism operable to move the carriage in a first direction and a second direction, the first direction being orthogonal to a longitudinal direction of the linear light source, and the second direction being reverse to the first direction;
a reference pattern member having a reference pattern and disposed at a position within a travel path of the carriage, such that the reference pattern is detectable by the image sensor;
a nonvolatile storage unit;
a data-write controller operable to (i) judge whether the carriage is currently located in a first area or a second area that are divided by a boundary defined in advance for acquiring information indicating the current location of the carriage and (ii) write an update of the current location information into the nonvolatile storage unit each time the carriage is moved across the boundary between the first and second areas, the boundary coinciding with the position of the reference pattern member or with a position shifted toward the first direction from the reference pattern member, the first area being located toward the first direction, and the second area being located toward the second direction; and
a carriage controller operable to, immediately upon power supply to the image reading apparatus, (i) control the carriage drive mechanism to move the carriage toward the reference pattern member based on the current location information held in the storage unit, and (ii) control, when the image sensor detects the reference pattern, the carriage drive mechanism to move the carriage in the second direction to a home position that is located a predetermined distance away from the reference pattern member.

2. The image reading apparatus according to claim 1, wherein
the image sensor is mounted on the carriage.

3. The image reading apparatus according to claim 1, wherein
the carriage controller is operable to control the carriage drive mechanism to move the carriage in the first direction, if the current location information held in the storage unit indicates that the carriage is currently located in the second area.

4. The image reading apparatus according to claim 3, wherein
a maximum travel distance is a distance that the carriage located in the second area travels at maximum to reach a position where the reference pattern is detectable by the image sensor, and
if the carriage located in the second area is moved the maximum travel distance in the first direction and still fails to detect the reference pattern, the carriage controller is operable to control the carriage drive mechanism to reverse the carriage in the second direction.

5. The image reading apparatus according to claim 1, wherein
the carriage controller is operable to control the carriage drive mechanism to move the carriage in the second direction, if the current location information held in the storage unit indicates that the carriage is currently located in the first area.

6. The image reading apparatus according to claim 5, wherein
a maximum travel distance is a distance that the carriage located in the second area travels at maximum to reach a position where the reference pattern is detectable by the image sensor, and
if the carriage located in the second area is moved the maximum travel distance in the first direction and still fails to detect the reference pattern, the carriage controller is operable to (i) control the carriage drive mechanism to stop the movement of the carriage and (ii) issue a warning.

7. The image reading apparatus according to claim 1, wherein
the reference pattern includes a black reference area and a white reference area that are adjacent to each other, the black and white reference areas being used respectively for adjusting a black color level and a white color level of the image sensor.

8. The image reading apparatus according to claim 1, wherein
a slit glass is located at a position shifted toward the second direction from the home position, such that a document sheet fed by an automatic document feeder passes over the slit glass, and
in a mode of reading an image of the document sheet passing over the slit glass, the carriage controller is operable to control the carriage drive mechanism to move the carriage to a position immediately below the slit glass, so that the image sensor is enabled to read the image of the document sheet passing over the slit glass.

9. The image reading apparatus according to claim 1, wherein
the boundary is defined to coincide with the position shifted toward the first direction from the reference pattern member.

10. The image reading apparatus according to claim 1, wherein
the boundary is defined to coincide with or in a vicinity of a midpoint of the platen glass lengthwise along a travel direction of the carriage.

11. The image reading apparatus according to claim 1, wherein
the carriage controller is operable to (i) control, immediately before the image sensor reads an image of the document sheet placed on the platen glass, the carriage drive mechanism to move the carriage to the position of the reference pattern member based on the current location information held in the storage unit, and (ii) control, when the image sensor detects the reference pattern, the carriage drive mechanism to move the carriage the predetermined distance in the second direction to the home position.

12. An image forming apparatus comprising:
an image reading apparatus as defined in claim 1; and
a printer unit operable to produce an image on a recording sheet according to image data read by the image reading apparatus.

13. A method for positioning a carriage of an image reading apparatus at a home position,
the image reading apparatus including:
the carriage having a linear light source operable to emit light onto a surface of a document sheet placed on a platen glass;
an image sensor operable to receive part of the emission light reflected from the surface of the document sheet;
a carriage drive mechanism operable to move the carriage in a first direction and a second direction, the first direction being orthogonal to a longitudinal direction of the linear light source, and the second direction being reverse to the first direction;
a reference pattern member having a reference pattern and disposed at a position within a travel path of the carriage, such that the reference pattern is detectable by the image sensor;
a nonvolatile storage unit;
a data-write controller; and
a carriage controller,
the method comprising:
a write step of (i) judging, by the data-write controller, whether the carriage is currently located in a first area or a second area that are divided by a boundary defined in advance for acquiring information indicating the current location of the carriage and (ii) writing, by the data-write controller, an update of the current location information into the nonvolatile storage unit each time the carriage is moved across the boundary between the first and second areas, the boundary coinciding with the position of the reference pattern member or with a position shifted toward the first direction from the reference pattern member, the first area being located toward the first direction, and the second area being located toward the second direction; and
a moving step of, immediately upon power supply to the image reading apparatus, (i) controlling the carriage drive mechanism by the carriage controller to move the carriage toward the reference pattern member based on the current location information held in the storage unit, and (ii) controlling, when the image sensor detects the reference pattern, the carriage drive mechanism by the carriage controller to move the carriage in the second direction to a home position that is located a predetermined distance away from the reference pattern member.

* * * * *